(12) United States Patent
Chou et al.

(10) Patent No.: US 11,374,529 B2
(45) Date of Patent: Jun. 28, 2022

(54) FAN SPEED CONTROL METHOD FOR AVOIDING INACCURATE CONTROL CAUSED BY SUDDEN CHANGE IN POWER SUPPLY OUTPUT STATE

(71) Applicant: SEA SONIC ELECTRONICS CO., LTD., Taipei (TW)

(72) Inventors: Sheng-Chien Chou, Taipei (TW); Hsiu-Cheng Chang, Taipei (TW); Wei-Chen Wu, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 17/077,825

(22) Filed: Oct. 22, 2020

(65) Prior Publication Data

US 2022/0131495 A1 Apr. 28, 2022

(51) Int. Cl.
*H02K 7/14* (2006.01)
*H02P 29/40* (2016.01)
*F04D 27/00* (2006.01)
*H02P 29/68* (2016.01)

(52) U.S. Cl.
CPC ............ *H02P 29/40* (2016.02); *F04D 27/004* (2013.01); *H02P 29/68* (2016.02)

(58) Field of Classification Search
CPC . H02P 29/40; H02P 29/68; G05B 2219/2614; G05B 21/00; F04D 27/004
See application file for complete search history.

(56) References Cited

U.S. PATENT DOCUMENTS 8,694,131 B2 * 4/2014 Burns ................ G06K 9/00704
700/38

FOREIGN PATENT DOCUMENTS

| CN | 1197736 A | * 11/1998 | .............. F01P 7/048 |
| TW | 200826813 A | 6/2008 | |
| TW | 201422128 A | 6/2014 | |

* cited by examiner

*Primary Examiner* — Karen Masih
(74) *Attorney, Agent, or Firm* — Muncy, Geissler, Olds & Lowe, P.C.

(57) ABSTRACT

The present invention provides a fan speed control method for avoiding inaccurate control caused by sudden changes in a power supply output state, including the steps of: acquiring an output current value of a power supply device; and then, determining a change of the output current value in a sampling timeframe, if a slope representing the change is positive, controlling the control signal generating unit to gradually replace the fan control signal currently output to the fan with another fan control signal on the basis of a first latency, and if the slope representing the change is negative, controlling the control signal generating unit to gradually replace the fan control signal currently output to the fan with another fan control signal on the basis of a second latency. The first latency and the second latency are determined by the output current value, respectively.

11 Claims, 11 Drawing Sheets

10

┌─────────────────────────────────────┐
│ acquiring the output current value  │
│ of the power supply device          │ ~11
└─────────────────────────────────────┘
                    │
┌─────────────────────────────────────┐
│ determining a change of the output current
│ value in a sampling timeframe, if a slope
│ representing the change is positive,
│ controlling a control signal generating
│ unit to gradually replace a fan control
│ signal currently output to a fan with   ~12
│ another fan control signal based on
│ a first latency, and if a slope
│ representing the change is negative,
│ controlling the control signal generating
│ unit to gradually replace the fan control
│ signal currently output to the fan with
│ another fan control signal based on a
│ second latency, the first latency and the
│ second latency are determined by the output
│ current value, respectively
└─────────────────────────────────────┘

```
                                              10
┌─────────────────────────────────────────┐
│  acquiring the output current value     │──── 11
│  of the power supply device             │
└─────────────────────────────────────────┘
                    │
┌─────────────────────────────────────────┐
│  defining a heat dissipation basic speed│
│  based on the output current value and  │──── 111
│  generating the fan control signal based│
│  on the heat dissipation basic speed    │
└─────────────────────────────────────────┘
                    │
┌─────────────────────────────────────────┐
│ determining a change of the output current
│ value in a sampling timeframe, if a slope
│ representing the change is positive,
│ controlling a control signal generating
│ unit to gradually replace a fan control
│ signal currently output to a fan with   │──── 12
│ another fan control signal based on
│ a first latency, and if a slope
│ representing the change is negative,
│ controlling the control signal generating
│ unit to gradually replace the fan control
│ signal currently output to the fan with
│ another fan control signal based on a
│ second latency, the first latency and the
│ second latency are determined by the output
│ current value, respectively
└─────────────────────────────────────────┘
```

```
┌─────────────────────────────────────┐
│  acquiring the output current value │──11
│  of the power supply device         │
└─────────────────────────────────────┘
                  │
┌─────────────────────────────────────┐
│ determining a change of the output current
│ value in a sampling timeframe, if a slope
│ representing the change is positive,
│ controlling a control signal generating
│ unit to gradually replace a fan control
│ signal currently output to a fan with
│ another fan control signal based on      │──12
│ a first latency, and if a slope
│ representing the change is negative,
│ controlling the control signal generating
│ unit to gradually replace the fan control
│ signal currently output to the fan with
│ another fan control signal based on a
│ second latency, the first latency and the
│ second latency are determined by the output
│ current value, respectively
└─────────────────────────────────────┘
                  │
┌─────────────────────────────────────┐
│ sensing the operating temperature,
│ defining a basic requirement for speed
│ based on the operating temperature, and  │──121
│ enabling the fan to speed up or slow down
│ by the fan control signal based on the
│ basic requirement for speed
└─────────────────────────────────────┘
```

┌─────────────────────────────────────────┐
│ acquiring the output current value      │ ~11
│ of the power supply device              │
└─────────────────────────────────────────┘
                    │
┌─────────────────────────────────────────┐
│ determining a change of the output current
│ value in a sampling timeframe, if a slope
│ representing the change is positive,
│ controlling a control signal generating
│ unit to gradually replace a fan control
│ signal currently output to a fan with
│ another fan control signal based on
│ a first latency, and if a slope
│ representing the change is negative,    │ ~12
│ controlling the control signal generating
│ unit to gradually replace the fan control
│ signal currently output to the fan with
│ another fan control signal based on a
│ second latency, the first latency and the
│ second latency are determined by the output
│ current value, respectively
└─────────────────────────────────────────┘
                    │
┌─────────────────────────────────────────┐
│ amplifying the fan control signal       │ ~123
│ by the signal amplifier                 │
└─────────────────────────────────────────┘

FAN SPEED CONTROL METHOD FOR AVOIDING INACCURATE CONTROL CAUSED BY SUDDEN CHANGE IN POWER SUPPLY OUTPUT STATE

FIELD OF THE INVENTION

The invention relates to a fan speed control method, more particularly, to a fan speed control method for avoiding inaccurate control caused by sudden changes in a power supply output state.

BACKGROUND OF THE INVENTION

With the development of science and technology, a fan available in the market can adjust speeds during rotation based on output states of power supply devices. Namely, if an output current of the power supply device rises, the speed of the fan increases, and if the output current of the power supply device falls, the speed of the fan decreases. Also, in the prior art, the speed of the fan is instantly changed according to the output state of the power supply device, as disclosed in Taiwanese patents No. TW 201422128 A, TW 200826813 A, etc. However, in the prior art, when the output state of the power supply device suddenly changes, the speed of the fan may not change instantly due to delays in transmission of signals between electronic components, and the speed always lags behind. Furthermore, when the output state of the power supply device is constantly changing, the fan is liable to actuation by mistake, leading to inaccurate control. Moreover, the components of the fan in the prior art are easily worn and damaged since the fan is experiencing frequent speed changes according to the sudden change of the power supply device.

SUMMARY OF THE INVENTION

An object of the invention is to solve the problem of inaccurate control of a fan when a power output state is suddenly changed.

To achieve the object, the invention provides a fan speed control method for avoiding inaccurate control caused by sudden changes in a power output state, comprising the steps of:

step A: acquiring an output current value of a power supply device; and step B: determining a change of the output current value in a sampling timeframe, if a slope representing the change is positive, controlling a control signal generating unit to gradually replace a fan control signal currently output to a fan with another fan control signal based on a first latency, and if a slope representing the change is negative, controlling the control signal generating unit to gradually replace the fan control signal currently output to the fan with another fan control signal based on a second latency, wherein the first latency and the second latency are determined by the output current value, respectively.

In an embodiment, the first latency is negatively correlated with the output current value.

In an embodiment, the second latency is positively correlated with the output current value.

In an embodiment, step A further comprises a sub-step: defining a heat dissipation basic speed based on the output current value, and generating the fan control signal based on the heat dissipation basic speed.

In an embodiment, the sampling timeframe comprises a plurality of sampling intervals, an average current value is calculated based on output current values in each of the plurality of sampling intervals, and the control signal generating unit is controlled according to a slope representing a change of a plurality of the average current values in the sampling timeframe.

In an embodiment, step B further comprises a sub-step: sensing an operating temperature, defining a basic requirement for speed based on the operating temperature, and enabling the fan to speed up or slow down by the fan control signal based on the basic requirement for speed.

In an embodiment, step B further comprises a sub-step: obtaining a temperature change parameter, and incorporating the temperature change parameter in calculations of the first latency and the second latency, wherein the temperature change parameter is calculated based on a previous sampling temperature and a current sampling temperature.

In an embodiment, step B further comprises a sub-step: amplifying the fan control signal by a signal amplifier.

Compared with the prior art, the invention has the following advantages: the first latency and the second latency are provided so that the fan can respond to the sudden change of the output state of the power supply by gradually changing the speed with the control signal generating unit when the current state is suddenly changed, thereby avoiding inaccurate control. Moreover, the fan speed control method of the invention can reduce the wear and tear to the components of the fan due to frequent speed changes according to the sudden change of the power supply device.

DETAILED DESCRIPTION OF THE PREFERRED EMBODIMENTS

The details and technical solutions of the invention will now be described with reference to the accompanying drawings as follows.

Figure 1:
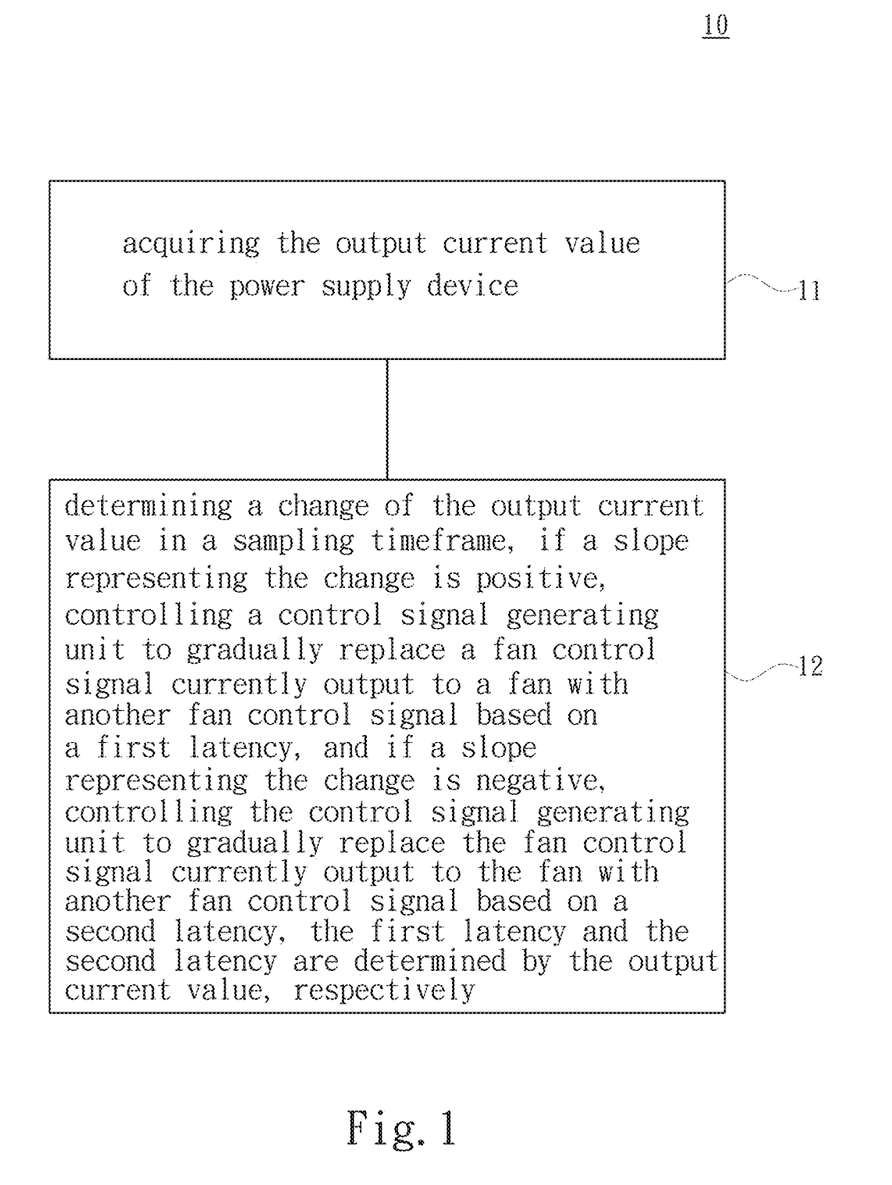
FIG. 1 is a flowchart of the steps of a first embodiment of the invention.
Figure 2:
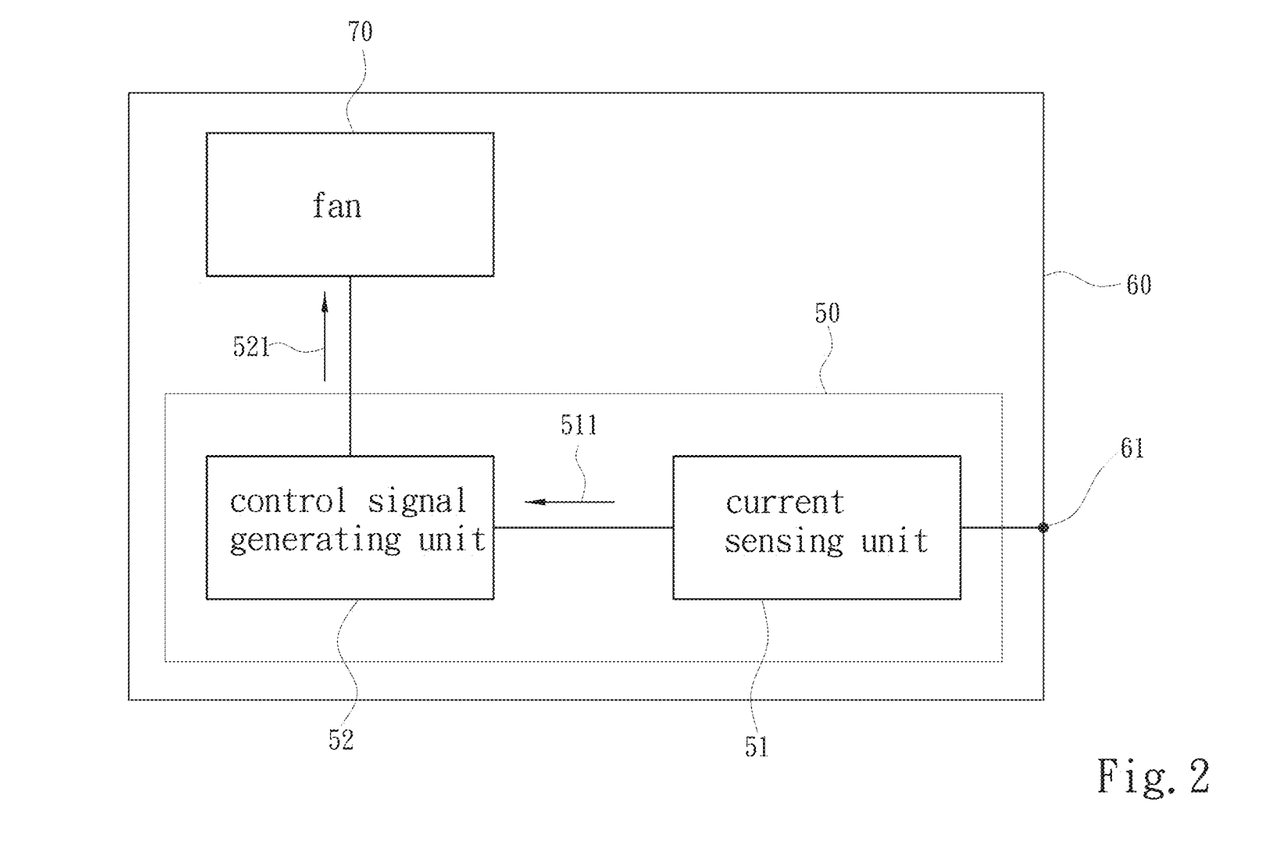
FIG. 2 is a units schematic diagram of a first embodiment of the invention.

Referring to FIG. 1 and FIG. 2, a fan speed control method 10 of the invention is used for avoiding inaccurate control caused by sudden changes in the power output state. Further, the invention will be described in detail below by taking an example of the fan speed control method 10 implemented by a fan driving circuit 50. The fan driving circuit 50 is provided in a power supply device 60 for controlling at least one fan 70 of the power supply device 60, and the fan driving circuit 50 includes a current sensing unit 51 and a control signal generating unit 52. The current sensing unit 51 is electrically connected with the power supply device 60 and disposed at an output end 61 of the power supply device 60 for sensing an output current value of the power supply device 60. Moreover, the control signal generating unit 52 is electrically connected with the current sensing unit 51 and the fan 70, and receives a current information 511 transmitted by the current sensing unit 51. The current information 511 indicates the output current value of the power supply device 60. Thereafter, the control signal generating unit 52 controls modulation conversion on the basis of the received current information 511, and transmits a fan control signal 521 to the fan 70, thereby controlling rotation of the fan 70.

Referring to FIG. 1, FIG. 2, FIG. 3, FIG. 4, FIG. 5, FIG. 6, and FIG. 7, the fan speed control method 10 includes the steps of:

step A 11: acquiring the output current value of the power supply device 60; and step B 12: determining a change of the output current value in a sampling timeframe 523, if a slope representing the change is positive, controlling the control signal generating unit 52 to gradually replace the fan control signal 521 currently output to the fan 70 with another fan control signal 521 based on a first latency 524, and if the slope representing the change is negative, controlling the control signal generating unit 52 to gradually replace the fan control signal 521 currently output to the fan 70 with another fan control signal 521 based on a second latency 525. The first latency 524 and the second latency 525 are determined by the output current value, respectively.

Figure 3:
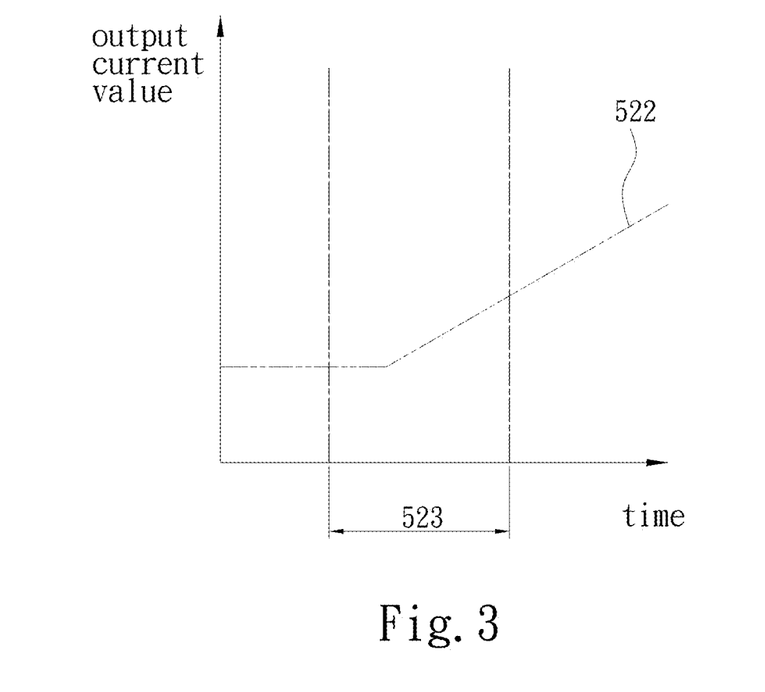
FIG. 3 is a first schematic diagram of a slope and a sampling timeframe according to an embodiment of the invention.
Figure 4:
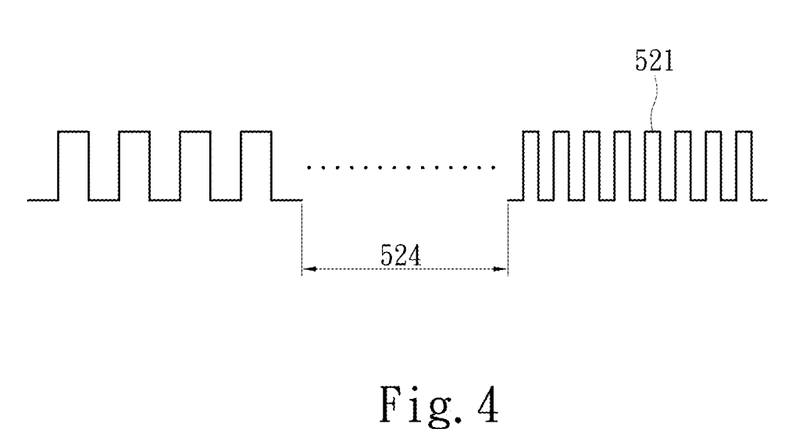
FIG. 4 is a schematic diagram of a first latency of fan speed in pulses according to an embodiment of the invention.

Specifically, in step A 11, an output state of the power supply device 60 is sensed by the current sensing unit 51, so that the output current value of the power supply device 60 is acquired, and the current information 511 is output to the control signal generating unit 52. Further, in the step B 12, the change of the output current value in the sampling timeframe 523 is determined by the control signal generating unit 52, wherein the sampling timeframe 523 indicates a certain period that the control signal generating unit 52 determines the magnitude of the current represented by a plurality of the current information 511 while the power supply device 60 is operating. The control signal generating unit 52 can continuously determine the current change in the sampling timeframe 523 right after the power supply device 60 is started, or the control signal generating unit 52 can determine the current change in the sampling timeframe 523 at intervals after the power supply device 60 is started. Further, as depicted in FIG. 3, the current change of the power supply device 60 is visualized as a trend line 522 by representing the current change of the power supply device 60 against the horizontal axis of time. When the control signal generating unit 52 determines that the magnitude of the current represented by the plurality of the current information 511 in the sampling timeframe 523 is gradually increasing (i.e., the slope of the current change is positive), the control signal generating unit 52 gradually replaces the fan control signal 521 currently output to the fan 70 with another fan control signal 521 based on the first latency 524, wherein the first latency 524 is determined by the output current value. More specifically, when the output current value of the power supply device 60 increases in the sampling timeframe 523 and the control signal generating unit 52 determines that the increase of the output current value, the control signal generating unit 52 adjusts the first latency 524 and replaces the signal output to the fan 70 based on the first latency 524, so that the fan 70 is controlled to operate by receiving another fan control signal 521. In an embodiment, the first latency 524 is obtained from a formula for calculating a speed-rising latency, which is:

$$t_{Rise} = t_S^a \times I_{out}^b \times K_A$$

where $t_{Rise}$ is the first latency 524, $t_s$ is a reference timeframe, $I_{out}$ is the output current value, a and b are non-zero positive or negative rational numbers, $K_A$ is a constant or a corresponding relation. The reference timeframe varies depending on the power supply device 60 and the fan driving circuit 50, for example, the reference timeframe may be set to one second. In another embodiment, the formula for calculating the speed-rising latency can also be:

$$t_{Rise} = \frac{t_s}{\frac{I_{out}}{I_{rate}}}$$

where $t_{Rise}$ is the first latency 524, $I_{out}$ is the output current, $I_{rate}$ is a rated output current, and $t_s$ is the reference timeframe. Accordingly, the first latency 524 can be shortened along with increase of the output current value, that is, the first latency 524 is negatively correlated with the output current value.

Figure 5:
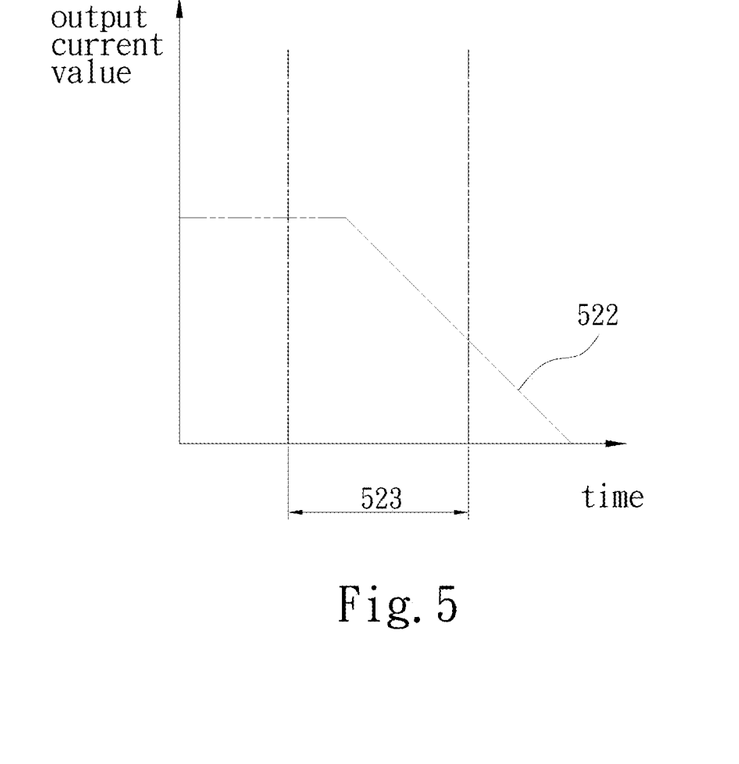
FIG. 5 is a second schematic diagram of a slope and a sampling timeframe according to an embodiment of the invention.
Figure 6:
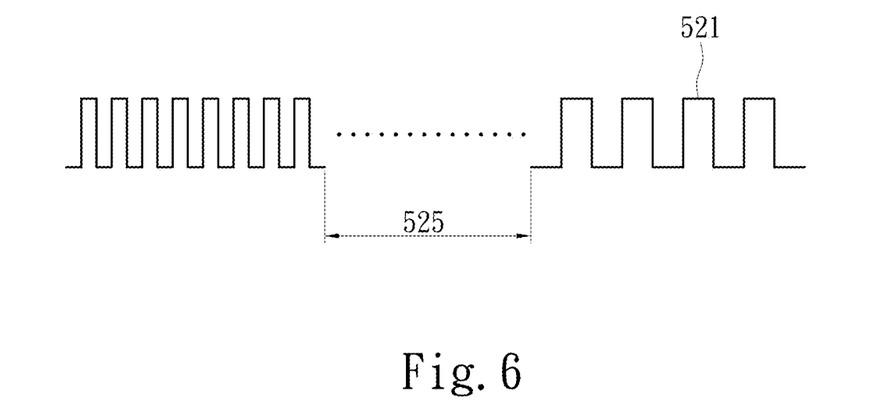
FIG. 6 is a schematic diagram of a second latency of fan speed in pulses according to an embodiment of the invention.

On the other hand, when the control signal generating unit 52 determines that the magnitude of the current represented by the plurality of the current information 511 in the sampling timeframe 523 is gradually decreasing (i.e., the slope of the current change is negative), the control signal generating unit 52 gradually replaces the fan control signal 521 currently output to the fan 70 with another fan control signal 521 based on the second latency 525, wherein the second latency 525 is correlated with the output current value. More specifically, when the output current value of the power supply device 60 decreases in the sampling timeframe 523 and the control signal generating unit 52 determines that the decrease of the output current value, the control signal generating unit 52 adjusts the second latency 525 and replaces the signal output to the fan 70 based on the second latency 525, so that the fan 70 is controlled to operate by receiving another fan control signal 521. In an embodiment, the second latency 525 is obtained from a formula for calculating a speed-falling latency, which is:

$$t_{Fall} = t_S^a \times I_{out}^b \times K_A$$

where $t_{Fall}$ is the second latency 525, $t_S$ is the reference timeframe, $I_{out}$ is the output current value, a and b are non-zero positive or negative rational numbers, $K_A$ is a constant or a corresponding relation. In another embodiment, the formula for calculating the speed-rising latency can also be:

$$t_{Fall} = \frac{t_s}{1 - \frac{I_{out}}{I_{rate}}}$$

where $t_{Fall}$ is the second latency 525, $I_{out}$ is the output current, $I_{rate}$ is the rated output current, and $t_s$ is the reference timeframe. Accordingly, the second latency 525 can be shortened along with decrease of the output current value, that is, the second latency 525 is positively correlated with the output current value.

Based on the description above, when the output current value changes, the control signal generating unit 52 controls the fan 70 to switch from an initial speed to a target speed with a transitional interval, rather than suddenly switch from the initial speed to the target speed, that is, the control signal generating unit 52 controls the speed of the fan 70 to gradually change within the transitional interval. As compared with the prior art, the invention can specifically solve the problem of inaccurate control of the fan 70 due to a sudden change in the output state of the power supply device 60.

Figure 7:
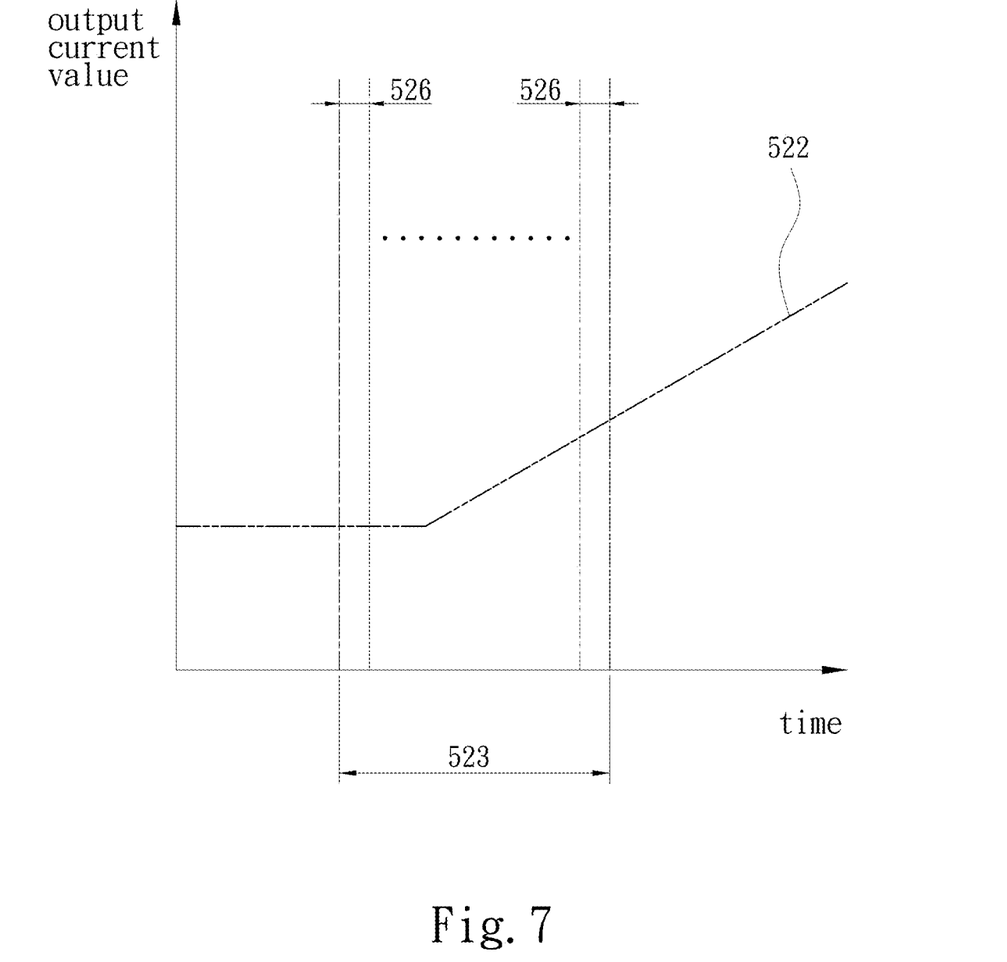
FIG. 7 is a schematic diagram of a plurality of sampling intervals according to an embodiment of the invention.

In an embodiment, the sampling timeframe 523 includes a plurality of sampling intervals 526. The control signal generating unit 52 calculates an average current value based on output current values in each of the plurality of sampling intervals 526, and the fan driving circuit 50 controls the control signal generating unit 52 based on f the slope representing a change of a plurality of the average current values in the sampling timeframe 523, so that the control signal generating unit 52 is controlled to replace the fan control signal 521 with another fan control signal 521 based on the slope representing the change of the plurality of the average current values, and the control signal generating unit 52 transmits the another fan control signal 521 to the fan 70.

Figure 8:
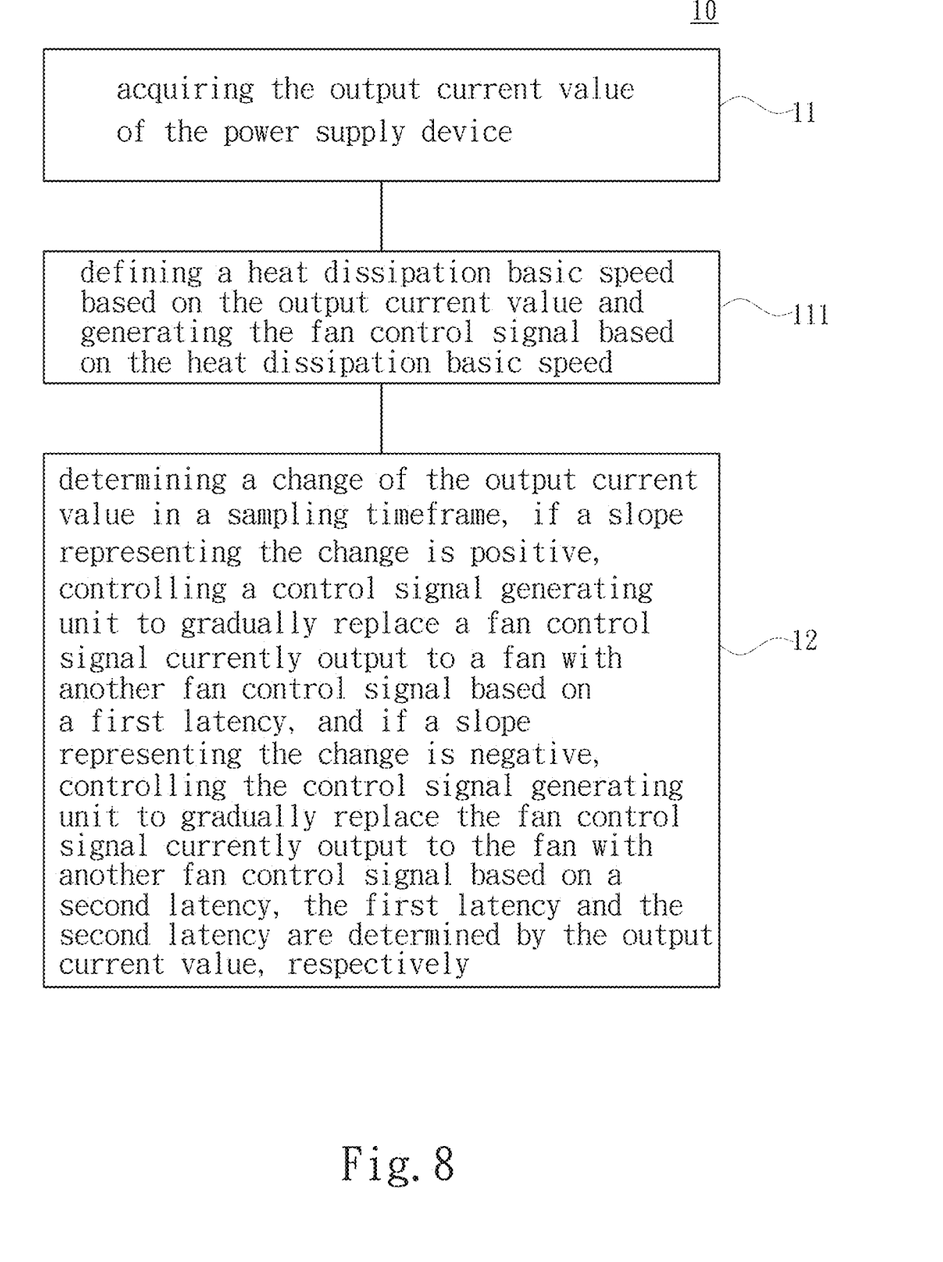
FIG. 8 is a flowchart of the steps of a second embodiment of the invention.

In an embodiment, referring to FIG. 8, step A 11 further includes a sub-step 111: defining a heat dissipation basic speed based on the output current value, and generating the fan control signal 521 based on the heat dissipation basic speed. Specifically, the control signal generating unit 52 defines different heat dissipation basic speeds on the basis of different output current values. For example, the control signal generating unit 52 may pre-store a plurality of heat dissipation basic speeds corresponding to different output current values, respectively. Then, the control signal acquires different output current values in different sampling timeframes 523 to determine the speed of the fan 70 based on the acquired output current value, and outputs the fan control signal 521 to the fan 70.

Figure 9:
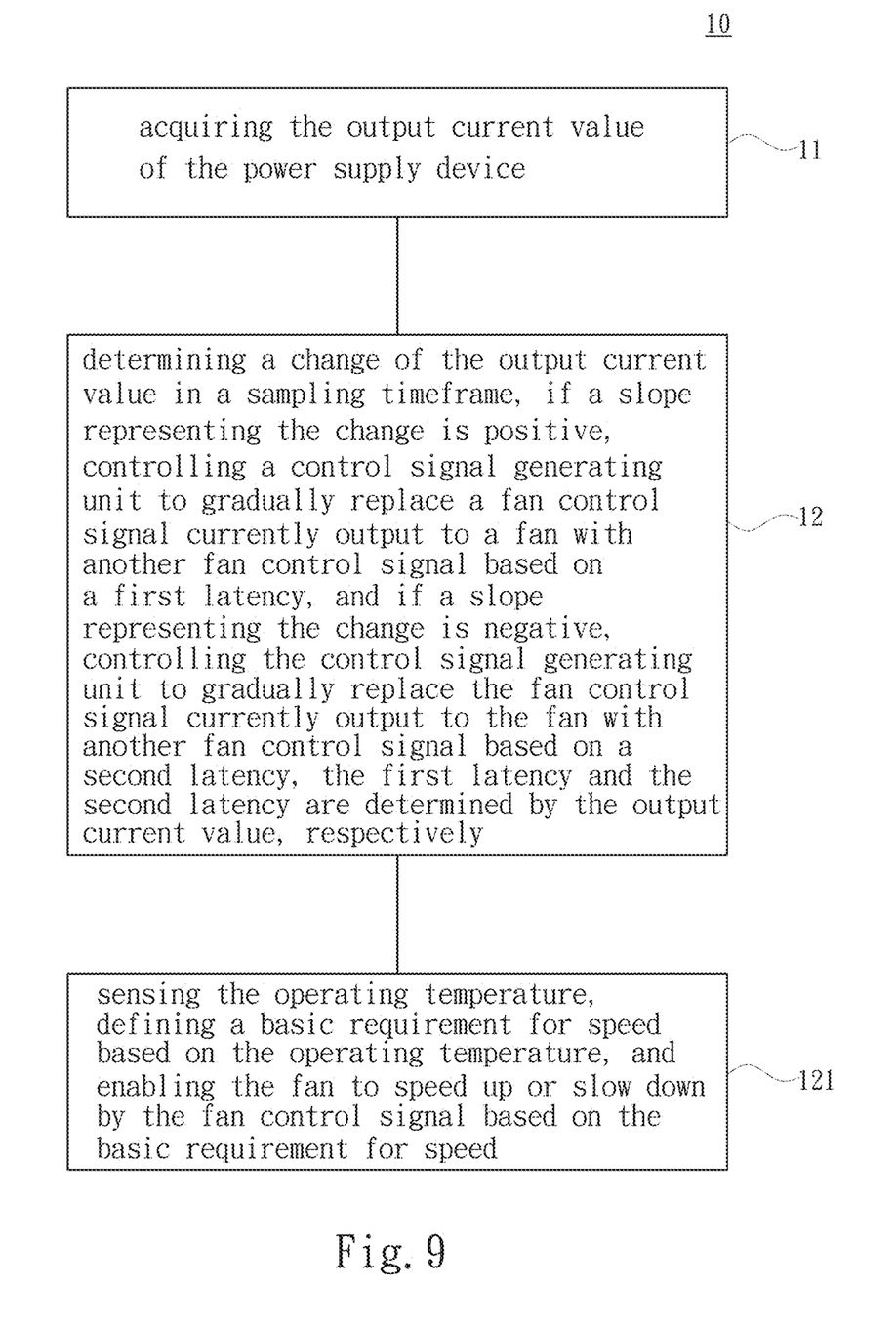
FIG. 9 is a flowchart of the steps of a third embodiment of the invention.
Figure 10:
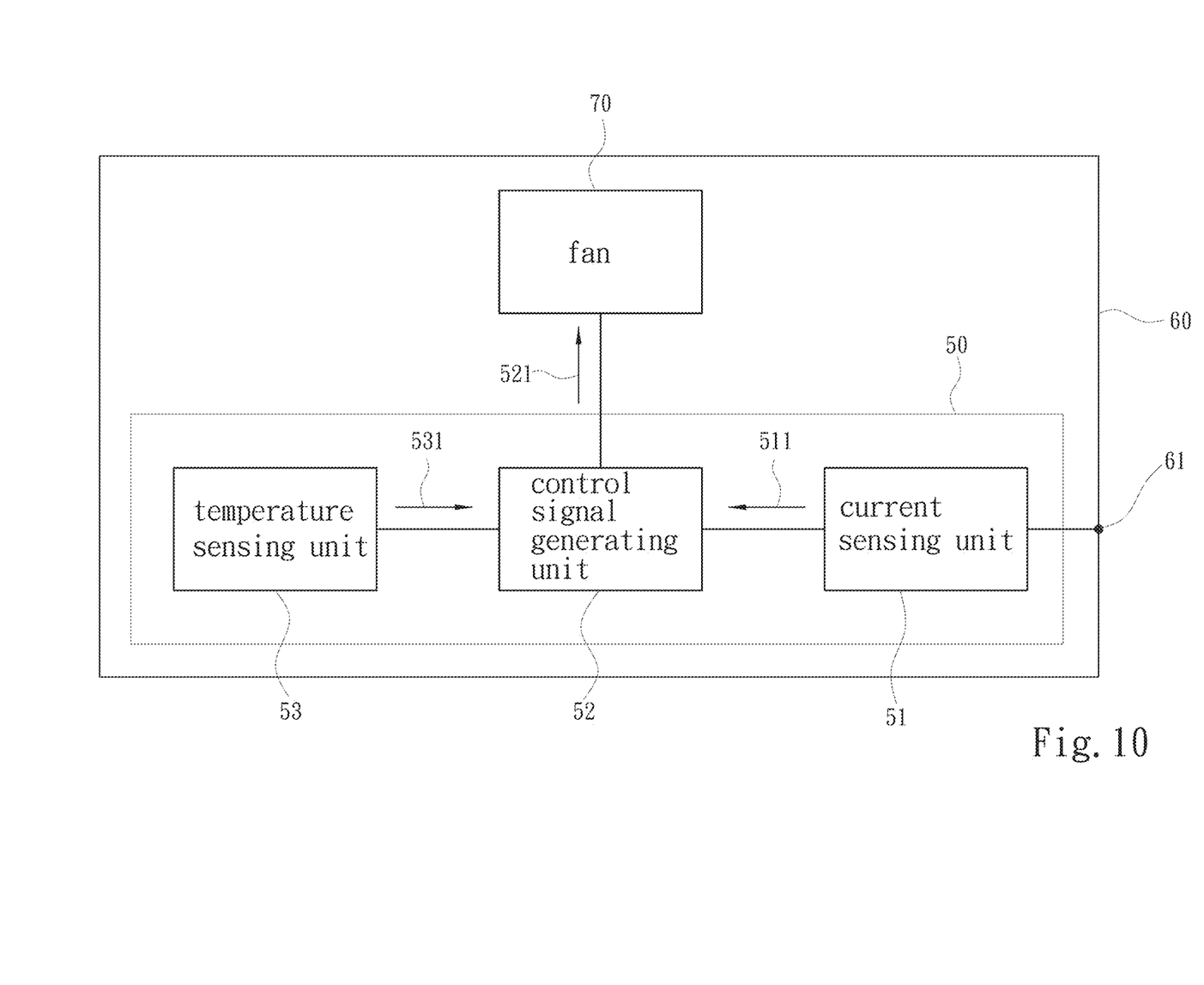
FIG. 10 a units schematic diagram of a third embodiment of the invention.

In another aspect, referring to FIG. 9 and FIG. 10, in an embodiment, the fan driving circuit 50 further includes a temperature sensing unit 53 provided inside the power supply device 60. The temperature sensing unit 53 senses an operating temperature inside the power supply device 60, generates temperature information 531 representing the operating temperature based on the operating temperature, and outputs the temperature information 531 to the control signal generating unit 52. In the embodiment, step B 12 of the fan speed control method 10 further includes a sub-step 121: outputting the temperature information 531 from the temperature sensing unit 53 to the control signal generating unit 52 after the temperature sensing unit 53 sensing the operating temperature, defining a basic requirement for speed by the control signal generating unit 52 based on the operating temperature, and enabling the fan 70 to speed up or slow down by the fan control signal 521 based on the basic requirement for speed. For example, when the current sensing unit 51 does not transmit the current information 511 of the power supply device 60 to the control signal generating unit 52, the control signal generating unit 52 controls the fan 70 to rotate at a speed of the basic requirement. Thereafter, once the current sensing unit 51 senses an increase of the output current value of the power supply device 60, the control signal generating unit 52 gradually increases the speed of the fan 70 based on the basic requirement for speed. On the contrary, if the current sensing unit 51 senses a decrease of the output current value of the power supply device 60, the speed of the fan 70 is controlled to be gradually decreased based on the basic requirement for speed.

Figure 11:
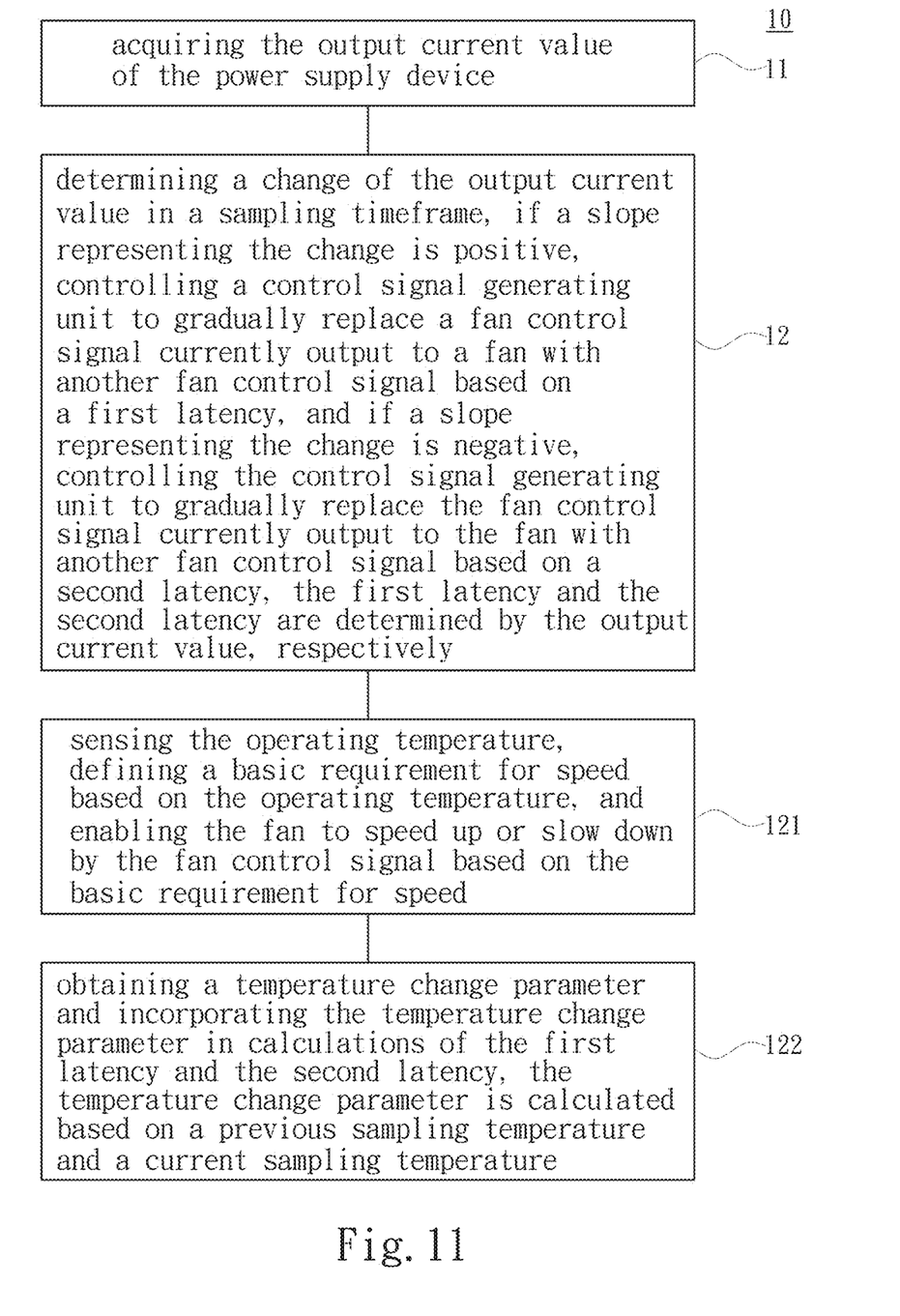
FIG. 11 is a flowchart of the steps of a fourth embodiment of the invention.

Moreover, in an embodiment, referring to FIG. 11, step B 12 further includes a sub-step 122: obtaining a temperature change parameter, and incorporating the temperature change parameter in calculations of the first latency 524 and the second latency 525, wherein the temperature change parameter is calculated based on a previous sampling temperature and a current sampling temperature. In an embodiment, a formula for calculating the temperature change parameter is:

$$K_T = T_0^c \times T_1^d \times K_B$$

where $K_T$ is the temperature change parameter, $T_0$ is the previous sampling temperature, $T_1$ is the current sampling temperature, c and d are non-zero positive or negative rational numbers, and $K_B$ is a constant or corresponding relation. In another embodiment, the formula for calculating the temperature change parameter:

$$K_T = \frac{T_0}{T_1}$$

where $K_T$ is the temperature change parameter, $T_0$ is the previous sampling temperature, and $T_1$ is the current sampling temperature. After the temperature change parameter is calculated by the control signal generating unit 52, the control signal generating unit 52 takes $K_T \times t_{Rise}$ and $K_T \times t_{Fall}$ as parameters for controlling the speed of the fan 70.

Figure 12:
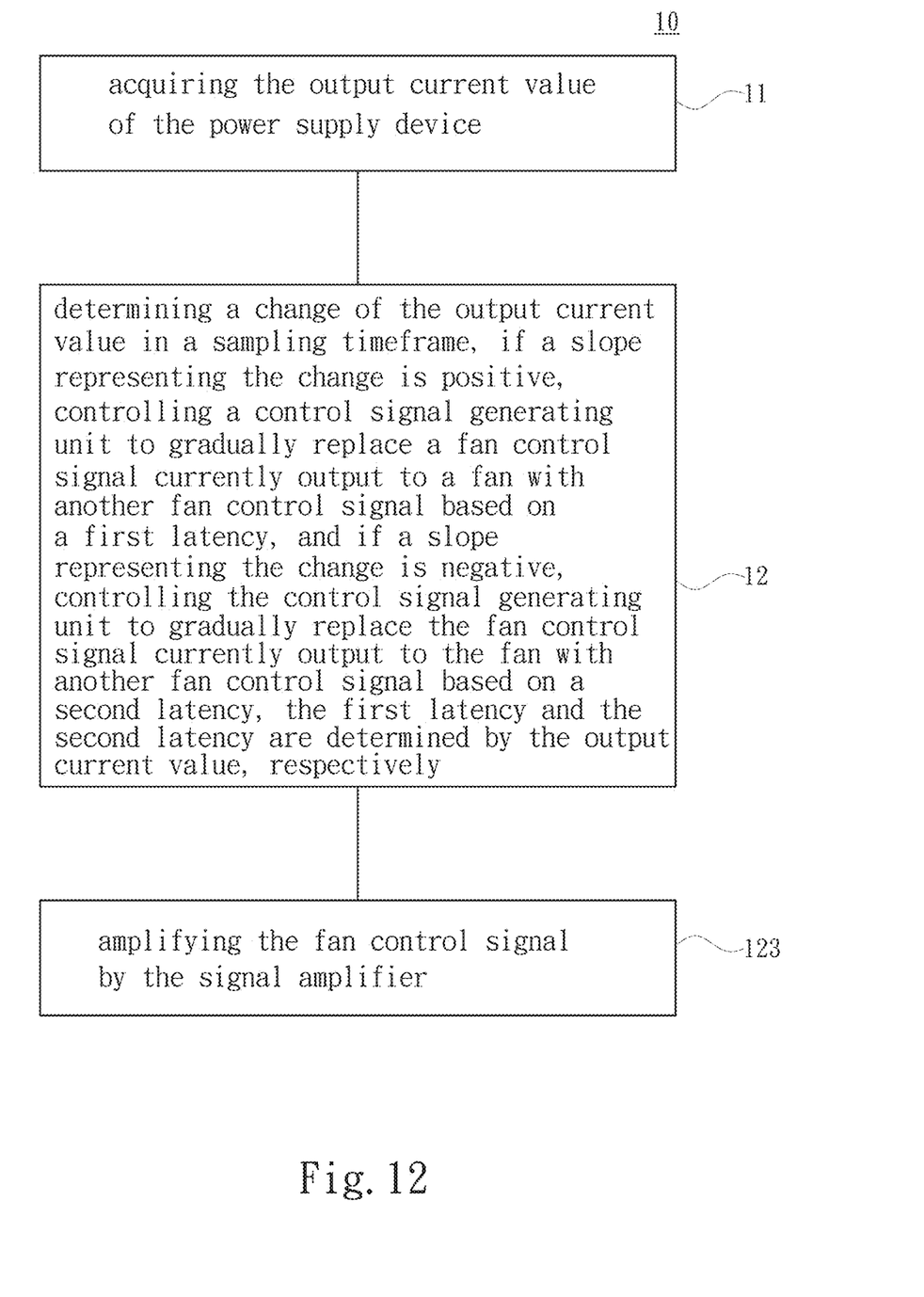
FIG. 12 is a flowchart of the steps of a fifth embodiment of the invention.
Figure 13:
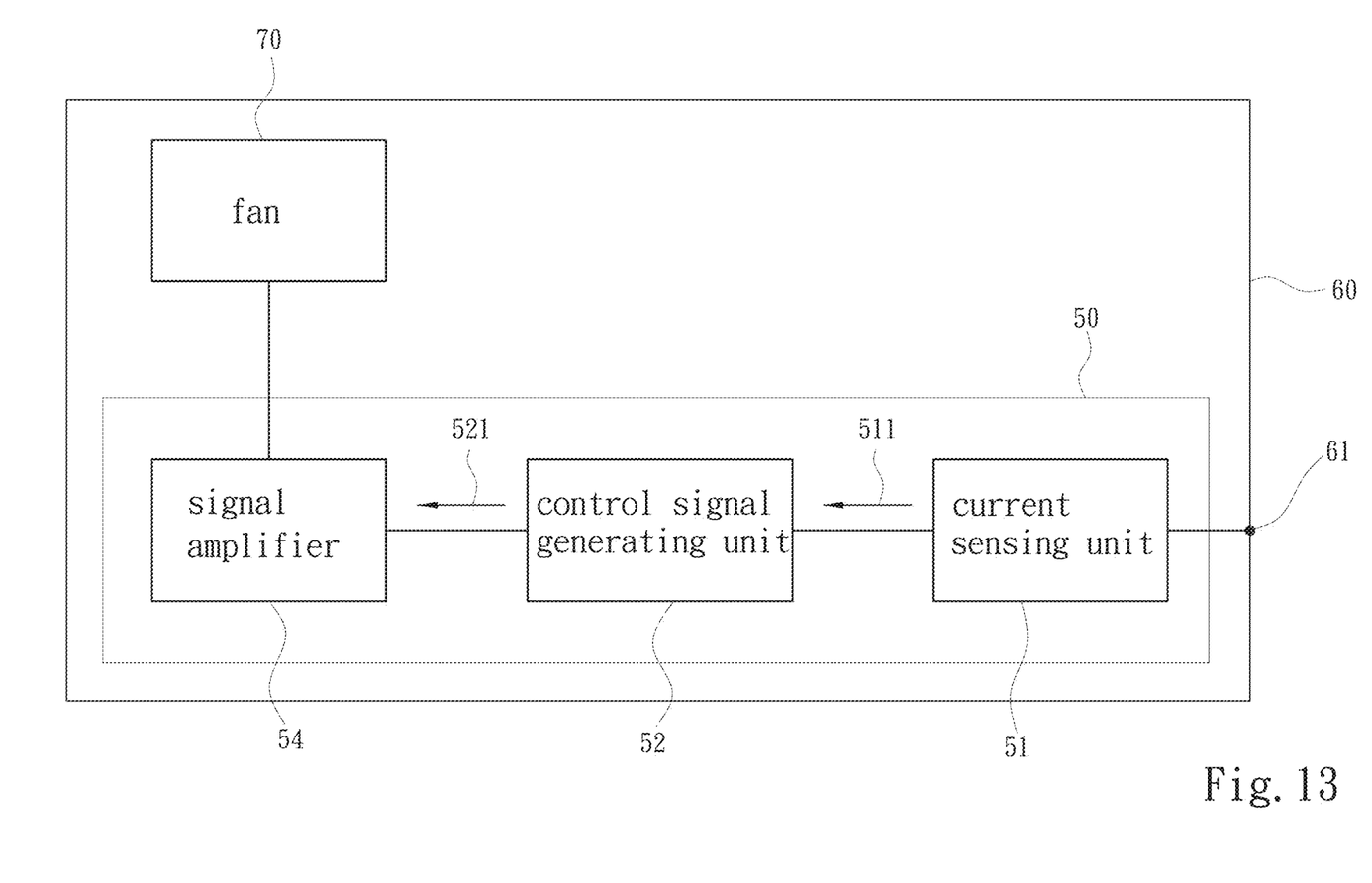
FIG. 13 a units schematic diagram of a fifth embodiment of the invention.

In another aspect, referring to FIG. 12 and FIG. 13, the fan driving circuit 50 of the invention further includes a signal amplifier 54 electrically connected with the control signal generating unit 52 and the fan 70. In addition, step B 12 of the fan speed control method 10 of the invention further includes a sub-step 123: amplifying the fan control signal 521 by the signal amplifier 54, thereby driving the fan 70.

What is claimed is:
1. A fan speed control method for avoiding inaccurate control caused by sudden changes in a power output state, comprising the steps of:
   step A: acquiring an output current value of a power supply device; and
   step B: determining a slope of a change of the output current value in a sampling timeframe, if the slope of the change is positive, controlling a control signal generating unit to gradually replace a fan control signal currently output to a fan with another fan control signal based on a first latency, and if the slope of the change is negative, controlling the control signal generating unit to gradually replace the fan control signal currently output to the fan with another fan control signal based on a second latency, wherein the first latency and the second latency are determined by the output current value, respectively, wherein the first latency is negatively correlated with the output current value, and the second latency is positively correlated with the output current value.

2. The fan speed control method for avoiding inaccurate control caused by sudden changes in a power output state according to claim 1, wherein the first latency is negatively correlated with the output current value.

3. The fan speed control method for avoiding inaccurate control caused by sudden changes in a power output state according to claim 2, wherein the second latency is positively correlated with the output current value.

4. The fan speed control method for avoiding inaccurate control caused by sudden changes in a power output state according to claim 3, wherein step A further comprises a sub-step: defining a heat dissipation basic speed based on the output current value, and generating the fan control signal based on the heat dissipation basic speed.

5. The fan speed control method for avoiding inaccurate control caused by sudden changes in a power output state according to claim 4, wherein the sampling timeframe comprises a plurality of sampling intervals, an average current value is calculated based on output current values in each of the plurality of sampling intervals, and the control signal generating unit is controlled according to a slope representing a change of a plurality of the average current values in the sampling timeframe.

6. The fan speed control method for avoiding inaccurate control caused by sudden changes in a power output state according to claim 5, wherein step B further comprises a sub-step: sensing an operating temperature, defining a basic requirement for speed based on the operating temperature, and enabling the fan to speed up or slow down by the fan control signal based on the basic requirement for speed.

7. The fan speed control method for avoiding inaccurate control caused by sudden changes in a power output state according to claim 6, wherein step B further comprises a sub-step: obtaining a temperature change parameter, and incorporating the temperature change parameter in calculations of the first latency and the second latency, wherein the temperature change parameter is calculated based on a previous sampling temperature and a current sampling temperature.

8. The fan speed control method for avoiding inaccurate control caused by sudden changes in a power output state according to claim 1, wherein step B further comprises a sub-step: sensing an operating temperature, defining a basic requirement for speed based on the operating temperature, and enabling the fan to speed up or slow down by the fan control signal based on the basic requirement for speed.

9. The fan speed control method for avoiding inaccurate control caused by sudden changes in a power output state according to claim 8, wherein step B further comprises a sub-step: obtaining a temperature change parameter, and incorporating the temperature change parameter in calculations of the first latency and the second latency, wherein the temperature change parameter is calculated based on a previous sampling temperature and a current sampling temperature.

10. The fan speed control method for avoiding inaccurate control caused by sudden changes in a power output state according to claim 1, wherein step B further comprises a sub-step: obtaining a temperature change parameter, and incorporating the temperature change parameter in calculations of the first latency and the second latency, wherein the temperature change parameter is calculated based on a previous sampling temperature and a current sampling temperature.

11. The fan speed control method for avoiding inaccurate control caused by sudden changes in a power output state according to claim 1, wherein step B further comprises a sub-step: amplifying the fan control signal by a signal amplifier.

\* \* \* \* \*